United States Patent
Fernando et al.

(10) Patent No.: US 12,141,176 B2
(45) Date of Patent: Nov. 12, 2024

(54) CLASSIFICATION SYSTEM AND CLASSIFICATION METHOD

(71) Applicant: Panasonic Intellectual Property Management Co., Ltd., Osaka (JP)

(72) Inventors: Jeffry Fernando, Osaka (JP); Hisaji Murata, Osaka (JP); Hideto Motomura, Kyoto (JP); Yuya Sugasawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 143 days.

(21) Appl. No.: 17/762,886

(22) PCT Filed: Aug. 28, 2020

(86) PCT No.: PCT/JP2020/032539
§ 371 (c)(1),
(2) Date: Mar. 23, 2022

(87) PCT Pub. No.: WO2021/070505
PCT Pub. Date: Apr. 15, 2021

(65) Prior Publication Data
US 2022/0342913 A1    Oct. 27, 2022

(30) Foreign Application Priority Data
Oct. 7, 2019    (JP) .................................. 2019-184815

(51) Int. Cl.
G06F 16/28    (2019.01)
(52) U.S. Cl.
CPC .................................. *G06F 16/287* (2019.01)

(58) Field of Classification Search
CPC ........ G06F 16/287; G06F 16/28; G06F 18/24; G06N 20/00; G06N 3/045; G06N 3/08; G06N 20/10; G06T 7/00
See application file for complete search history.

(56) References Cited

U.S. PATENT DOCUMENTS

| | | | | |
|---|---|---|---|---|
| 5,625,632 A | * | 4/1997 | Ishida | G11B 20/10009 714/709 |
| 5,870,729 A | * | 2/1999 | Yoda | G06F 18/24137 706/26 |

(Continued)

FOREIGN PATENT DOCUMENTS

| | | |
|---|---|---|
| JP | 5-035707 | 2/1993 |
| JP | 5-342272 | 12/1993 |

(Continued)

OTHER PUBLICATIONS

International Search Report of PCT application No. PCT/JP2020/032539 dated Nov. 17, 2020.

*Primary Examiner* — Angelica Ruiz
(74) *Attorney, Agent, or Firm* — Rimon P.C.

(57) ABSTRACT

Even when data that can belong to a new class that is not in an existing class is input, this data can be easily classified appropriately. Classification system includes input reception part, classification part, calculation part, determination part, and presentation part. Input reception part receives an input of target data. Classification part classifies the target data into any one of a plurality of classes. Calculation part calculates a feature amount of the target data. Determination part determines a possibility that the target data is classified into the new class based on a classification result in classification part and the feature amount of the target data calculated by calculation part. When determination part determines that there is a possibility that the target data is (Continued)

classified into the new class, presentation part presents a determination result of determination part.

16 Claims, 7 Drawing Sheets

(56) References Cited

U.S. PATENT DOCUMENTS

| | | | | |
|---|---|---|---|---|
| 7,471,832 | B2* | 12/2008 | Luo | G06F 18/254 |
| | | | | 348/148 |
| 10,474,950 | B2* | 11/2019 | He | G06N 3/08 |
| 11,205,122 | B1* | 12/2021 | Arel | G06N 3/08 |
| 2010/0014721 | A1* | 1/2010 | Steinberg | G06F 16/583 |
| | | | | 382/118 |
| 2010/0172555 | A1* | 7/2010 | Hasezawa | G06V 10/7715 |
| | | | | 382/128 |
| 2012/0287304 | A1 | 11/2012 | Kutaragi et al. | |
| 2014/0126830 | A1 | 5/2014 | Suganuma et al. | |
| 2017/0039469 | A1 | 2/2017 | Majumdar et al. | |
| 2017/0091671 | A1* | 3/2017 | Mitarai | G06F 16/285 |
| 2017/0243051 | A1* | 8/2017 | Chukka | G06F 18/254 |
| 2018/0268258 | A1 | 9/2018 | Tapia et al. | |
| 2018/0285731 | A1* | 10/2018 | Heifets | G06N 3/04 |
| 2019/0087384 | A1* | 3/2019 | Goto | G06F 18/214 |
| 2019/0354850 | A1* | 11/2019 | Watson | G06N 3/045 |
| 2020/0366079 | A1* | 11/2020 | Telefus | H02H 3/08 |

FOREIGN PATENT DOCUMENTS

| | | |
|---|---|---|
| JP | 2002-117046 | 4/2002 |
| JP | 2014-095967 | 5/2014 |
| WO | 2011/081192 | 7/2011 |
| WO | 2018/170028 | 9/2018 |

* cited by examiner

CLASSIFICATION SYSTEM AND CLASSIFICATION METHOD

CROSS-REFERENCE TO RELATED APPLICATIONS

This application is a U.S. national stage application of the PCT International Application No. PCT/JP2020/032539 filed on Aug. 28, 2020, which claims the benefit of foreign priority of Japanese patent application No. 2019-184815 filed on Oct. 7, 2019, the contents all of which are incorporated herein by reference.

FIELD OF THE INVENTION

The present disclosure generally relates to a classification system, a classification method, and a program. More specifically, the present disclosure relates to a classification system, a classification method, and a program for classifying input data.

DESCRIPTION OF THE RELATED ART

PTL 1 discloses a classification method for converting an input pattern to be classified into an output pattern that is a classification result using a neural network. In this method, the output pattern of the neural network for the input pattern is compared with a correct output pattern output later for the input pattern, and comparison results are sequentially accumulated as an execution history. Then, an accumulated result is monitored, and an anomaly of the result is detected. In addition, for example, PTL 2 discloses a classification method.

CITATIONS LIST

Patent Literatures

PTL 1: Unexamined Japanese Patent Publication No. H05-35707
PTL 2: US 2017/0,039,469 A

SUMMARY OF THE INVENTION

In the classification method described in PTL 1, there is a problem that target data cannot be appropriately classified when the target data that can belong to a new class that is not in an existing output pattern (class) is input.

The present disclosure has been made in view of the above points, and an object of the present disclosure is to provide a classification system, a classification method, and a program that facilitate appropriate classification of target data even when the target data that can belong to a new class that is not in an existing class is input.

A classification system according to one aspect of the present disclosure includes an input reception part, a classification part, a calculation part, and a determination part. The input reception part receives an input of target data. The classification part classifies the target data into any one of a plurality of classes. The calculation part calculates a feature amount of the target data. The determination part determines whether it is possible that the target data is classified into a new class different from the plurality of classes based on a classification result in the classification part and the feature amount of the target data calculated by the calculation part.

A classification method according to one aspect of the present disclosure includes an input reception step, a classification step, a calculation step, and a determination step. The input reception step is a step of receiving an input of target data. The classification step is a step of classifying the target data into any one of a plurality of classes. The calculation step is a step of calculating a feature amount of the target data. The determination step is a step of determining whether it is possible that the target data is classified into a new class different from the plurality of classes based on a classification result in the classification step and the feature amount of the target data calculated in the calculation step.

A program according to one aspect of the present disclosure causes one or more processors to execute the above-described classification method.

The present disclosure has an advantage that it is easy to appropriately classify target data even when the target data that can belong to a new class that is not in an existing class is input.

DETAILED DESCRIPTION OF THE PREFERRED EMBODIMENTS

(1) Outline

Figure 2:
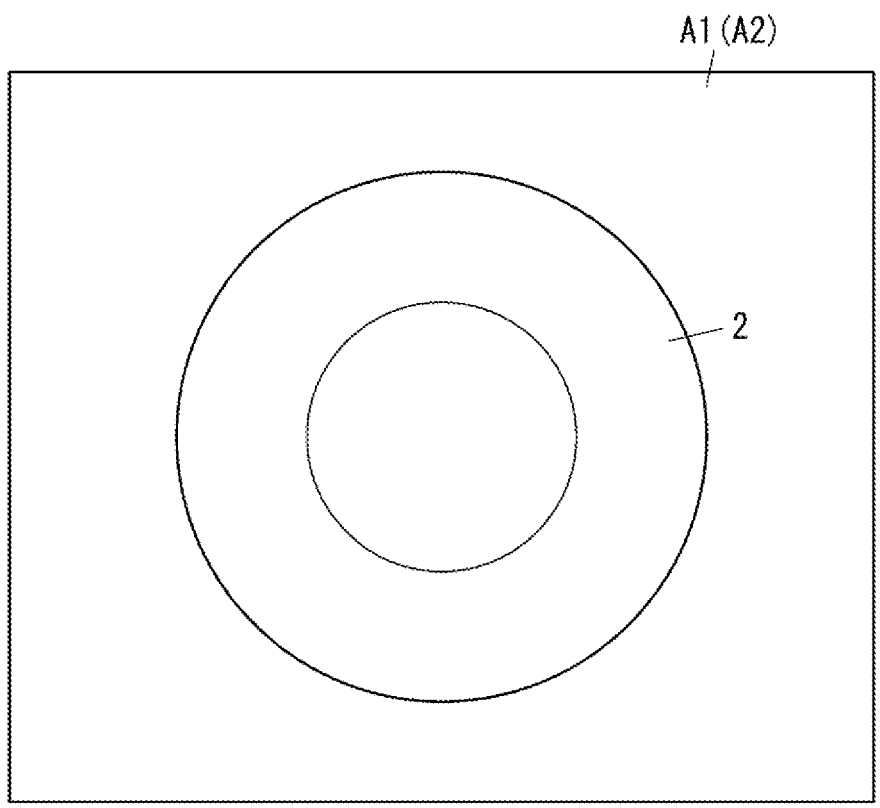
FIG. 2 is an explanatory diagram illustrating an example of target data input to the classification system.

Classification system 100 according to the present exemplary embodiment is a system for classifying target data into any of a plurality of classes. In the present exemplary embodiment, the target data is data representing target image A1 (see FIG. 2). Target image A1 is an image of determination object 2. Determination object 2 is, for example, a can. Target image A1 illustrated in FIG. 2 represents a bottom surface of the can in a normal state. Here, determination object 2 can take at least one of a normal state and a plurality of types of abnormal states. As an example, the abnormal state may include a state in which there is a dot dent, a state in which there is a line scratch, a state in which there is a circle scratch on determination object 2, a state in which dirt is attached, and a state in which a foreign matter (liquid or the like) is attached to the determination object 2. That is, classification system 100 classifies determination object 2 into any of the plurality of classes (Here, the normal state and the plurality of types of abnormal states). Therefore, classification system 100 can be used for inspecting determination object 2.

Figure 1:
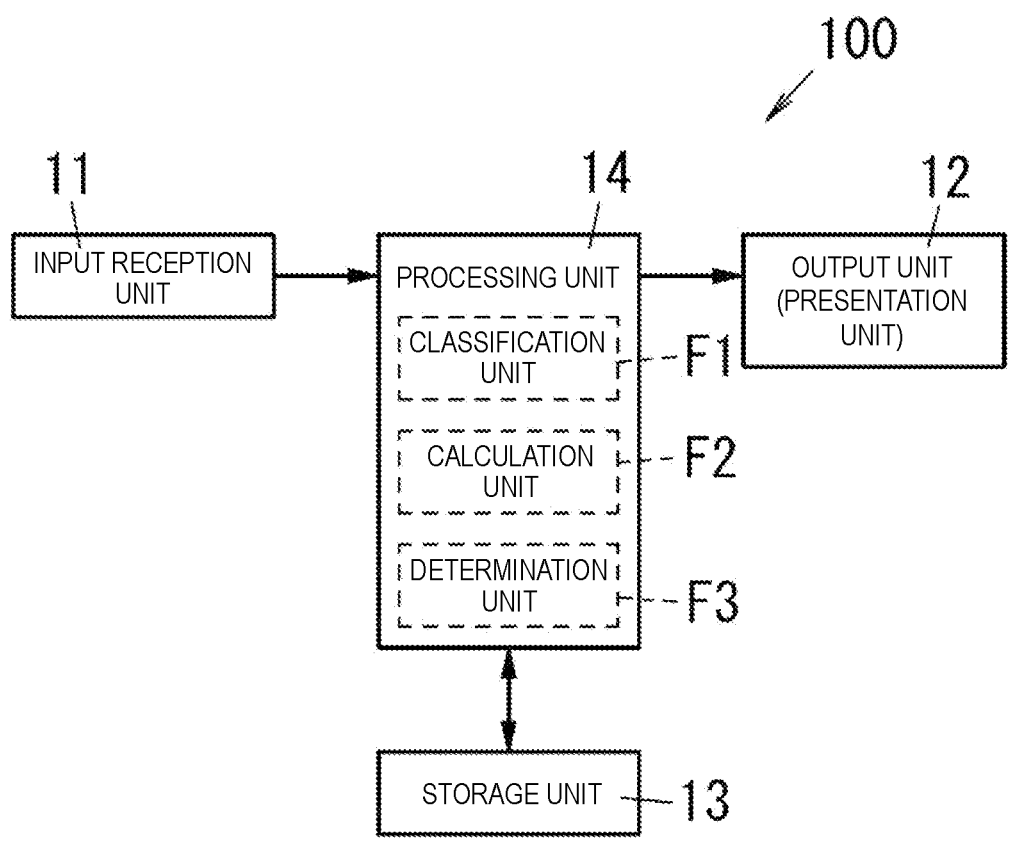
FIG. 1 is a block diagram illustrating a configuration of a classification system according to an exemplary embodiment of the present disclosure.

As illustrated in FIG. 1, classification system 100 includes input reception part 11, classification part F1, calculation part F2, determination part F3, and presentation part (output part) 12.

Input reception part 11 receives an input of target data. In the present exemplary embodiment, as an example, image data obtained by imaging determination object 2 with an imaging device is input to input reception part 11 as target data.

Classification part F1 classifies the target data into any one of the plurality of classes. In the present exemplary embodiment, classification part F1 classifies the target data using a learned model obtained by machine learning of an input and output relationship between the target data and a classification result in advance. That is, the plurality of classes correspond to existing classes defined in advance by machine learning.

Calculation part F2 calculates a feature amount of the target data. In the present exemplary embodiment, as an example, the feature amount is calculated based on a difference between a feature vector of image data as target data and a feature vector of image data as a reference.

Determination part F3 determines a possibility that the target data is classified into a new class different from the plurality of classes based on a classification result in classification part F1 and the feature amount of the target data calculated by calculation part F2. That is, determination part F3 determines the possibility that the target data should be classified into the new class rather than classified into any of the plurality of existing classes.

When determination part F3 determines that there is a possibility that the target data is classified into the new class, presentation part 12 presents a determination result of determination part F3. As an example, presentation part 12 presents the determination result to a user of classification system 100 by a display device such as a liquid crystal display.

As described above, in the present exemplary embodiment, when determination part F3 determines that there is a possibility that the target data is classified into the new class, classification system 100 presents to the user that the new class is necessary, instead of automatically relearning classification part F1 and classifying the target data into the new class. Therefore, in the present exemplary embodiment, there is an advantage that even when target data that can belong to a new class that is not in an existing class is input, the target data can be easily classified appropriately.

(2) Details

Hereinafter, classification system 100 according to the present exemplary embodiment will be described with reference to FIG. 1. Classification system 100 includes input reception part 11, output part 12, storage part 13, and processing part 14.

Input reception part 11 receives an input of target data. That is, input reception part 11 is an execution subject of input reception step S1 to be described later. In the present exemplary embodiment, input reception part 11 is a communication interface that receives a signal transmitted from another device by wired communication or wireless communication, and receives an input of image data of determination object 2 captured by the imaging device as target data. The target data (image data of determination object 2) may be directly transmitted from the imaging device to input reception part 11, or may be indirectly transmitted via an intermediate medium. The target data received by input reception part 11 is provided to processing part 14.

Processing part 14 is configured to control the overall control of classification system 100, that is, control input reception part 11, output part 12, and storage part 13. Processing part 14 mainly includes a computer system including one or more processors and memories. Therefore, one or more processors function as processing part 14 by executing a program recorded in the memory. The program may be recorded in advance in the memory, may be provided through a telecommunication line such as the Internet, or may be provided by being recorded in a non-transitory recording medium such as a memory card.

Processing part 14 includes classification part F1, calculation part F2, and determination part F3. In FIG. 1, classification part F1, calculation part F2, and determination part F3 do not indicate substantial configurations, but indicate functions implemented by processing part 14.

Figure 3:
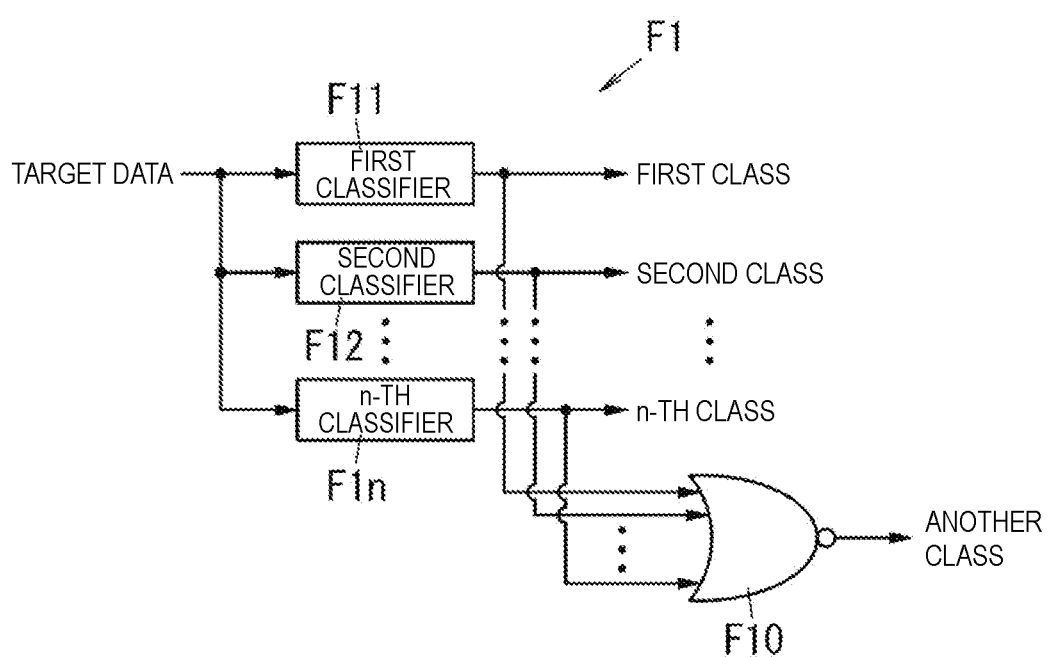
FIG. 3 is an explanatory diagram illustrating a configuration of a classification part in the classification system.

Classification part F1 is configured to classify the target data into any one of the plurality of classes. That is, classification part F1 is an execution subject of classification step S3 described later. In the present exemplary embodiment, as illustrated in FIG. 3, classification part F1 includes a plurality of classifiers F11 to F1$n$ ("n" is an integer of two or more), and NOR circuit F10.

Each of classifiers F11 to F1$n$ may include a classifier using a neural network or a classifier generated by deep learning using a multilayer neural network, in addition to a linear classifier such as a support vector machine (SVM). In the present exemplary embodiment, each of classifiers F11 to F1$n$ is a classifier using a learned neural network. The learned neural network may include, for example, a convolutional neural network (CNN), a bayesian neural network (BNN), or the like. Each of classifiers F11 to F1$n$ can be realized by mounting a learned neural network on an integrated circuit such as an application specific integrated circuit (ASIC) or a field-programmable gate array (FPGA).

In the present exemplary embodiment, the plurality of classes includes a plurality of corresponding classes (a first class, a second class, . . . , an n-th class) and another class. The plurality of corresponding classes are classes respectively corresponding to the plurality of classifiers F11 to F1$n$ included in classification part F1. That is, in the present exemplary embodiment, the target data is input to each of the plurality of classifiers F11 to F1$n$. Then, each of the plurality of classifiers F11 to F1$n$ determines whether or not the input target data is classified into the corresponding class corresponding to itself. For example, whether or not the target data is classified into the n-th class is classified by n-th classifier F1$n$. That is, when the target data is input to n-th classifier F1$n$, if an output of n-th classifier F1$n$ is "High", it is determined that the target data is classified into the n-th class, and if "Low", it is determined that the target data is not classified into the n-th class.

In the present exemplary embodiment, for example, each of classifiers F11 to F1$n$ outputs "High" when a certainty factor exceeds a threshold, and outputs "Low" when the certainty factor falls below the threshold. The "certainty factor" in the present disclosure refers to a probability that target data belongs to a class classified by classification part F1. For example, if the certainty factor in first classifier F11 is "1", classification part F1 determines that a probability that the target data belongs to the first class is 100%. Furthermore, for example, if the certainty factor in first classifier F11 is "0.8", classification part F1 has determined that a probability that the target data belongs to the first class is 80% and a probability that the target data belongs to the other class is 20%.

Outputs of the plurality of classifiers F11 to F1n are input to NOR circuit F10. Then, NOR circuit F10 outputs "High" when the outputs of all classifiers F11 to F1n are "Low". Here, the other class is a class that does not correspond to any of the plurality of classifiers F11 to F1n. That is, the target data classified into the other class is data not classified into any of the first class to the n-th class that are the plurality of corresponding classes. In the present exemplary embodiment, when NOR circuit F10 outputs "High", that is, when the outputs of all classifiers F11 to F1n are "Low", the target data is classified into the other class.

As described above, in the present exemplary embodiment, classification part F1 classifies the target data received by input reception part 11 into any of the plurality of classes by the plurality of classifiers F11 to F1n and NOR circuit F10. Note that classification part F1 basically classifies the target data into any one of the plurality of classes, but may classify the target data into two or more corresponding classes among the plurality of corresponding classes.

Calculation part F2 is configured to calculate a feature amount of the target data. That is, calculation part F2 is an execution subject of calculation step S2 described later. For the calculation of the feature amount, reference data serving as a reference of the target data is used. The reference data is an image of determination object 2 similarly to the target data. In the present exemplary embodiment, the reference data is data indicating an image (reference image) of determination object 2 in a normal state. Here, target image A1 illustrated in FIG. 2 represents an image of determination object 2 in a normal state, and can be used as reference image A2. In the present exemplary embodiment, in calculating the feature amount, target image A1 is normalized such that the position and size of determination object 2 match the position and size of determination object 2 in reference image A2.

As an example, calculation part F2 calculates the feature amount of the target data using a feature vector. For example, calculation part F2 calculates a feature vector for each block having the same size including one or more pixels, which is commonly set in target image A1 and reference image A2. The feature vector has a pixel value of a pixel included in the block as an element. Then, calculation part F2 calculates a difference vector between the feature vector for each block of target image A1 and the feature vector for each block of reference image A2 as the feature amount of the target data. The feature amount calculated here is represented as a multi-dimensional vector based on the number of blocks and the number of pixels for each block.

Figure 4:
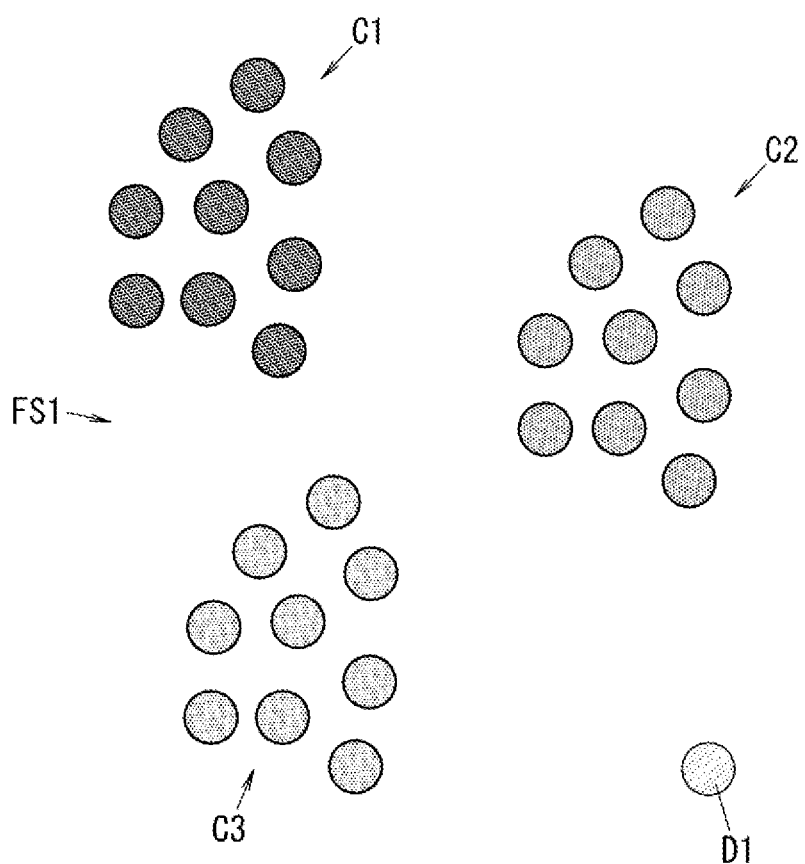
FIG. 4 is an explanatory diagram illustrating an example of a first determination operation in a determination part in the classification system.

In the present exemplary embodiment, calculation part F2 further performs appropriate conversion processing such as t-distributed stochastic neighbor embedding (t-SNE) on the feature amount of the target data calculated as described above. As a result, for example, as illustrated in FIG. 4, calculation part F2 calculates the feature amount of the target data as point D1 on two-dimensional feature amount space FS1. Of course, the feature amount of the target data may be represented as a point on a three-dimensional or multi-dimensional feature amount space.

Determination part F3 is configured to determine a possibility that the target data is classified into a new class different from the plurality of classes based on a classification result in classification part F1 and the feature amount of the target data calculated by calculation part F2. That is, determination part F3 is an execution subject of determination steps S4 to S8 described later.

In the present exemplary embodiment, determination part F3 distinguishes and determines whether the target data is classified into the other class or the new class. That is, in the present exemplary embodiment, when the target data is classified into the other class by classification part F1, determination part F3 does not immediately classify the target data into the new class, but sets the target data as a candidate for the new class, for example, when a predetermined condition is further satisfied. Then, when the predetermined condition is not satisfied, determination part F3 classifies the target data into the other class. Furthermore, in the present exemplary embodiment, determination part F3 also determines whether or not the target data is a candidate for the new class when the target data is classified into two or more corresponding classes by classification part F1.

As an example, in a case where the target data is classified into the other class by classification part F1, determination part F3 sets the target data as a candidate to be classified into the new class if the target data satisfies "condition A". On the other hand, when the target data does not satisfy "condition A", it is determined that the target data is classified into the other class.

"Condition A" means that the feature amount of the target data is separated from any of the plurality of corresponding classes by greater than or equal to a predetermined distance in feature amount space FS1. An example in which "condition A" is satisfied will be described with reference to FIG. 4. In FIG. 4, "C1" to "C3" represent groups of feature amounts of the target data classified into the first class to the third class in the past in feature amount space FS1, respectively. In FIG. 4, the feature amounts of the target data are represented by different patterns for "C1" to "C3", respectively. In FIG. 4, "D1" represents the feature amount of the target data classified by classification part F1 in feature amount space FS1. Note that, although not illustrated in FIG. 4, feature amount space FS1 also includes a group of feature amounts of target data classified in the past into classes other than the first class to the third class.

As illustrated in FIG. 4, "D1" is at a position separated from any of "C1" to "C3" by greater than or equal to a predetermined distance. Here, "being separated by greater than or equal to a predetermined distance" means that "D1" is located outside a circle centered on a center point of each class in feature amount space FS1, for example. In addition, "being separated by greater than or equal to a predetermined distance" means that, as an example, in feature amount space FS1, a distance between a feature amount at a position closest to "D1" among feature amounts of target data of each class and "D1" is longer than a predetermined value.

Further, as an example, in a case where the target data is classified into two or more corresponding classes among the plurality of corresponding classes by classification part F1, determination part F3 sets the target data as a candidate to be classified into the new class if the target data satisfies "condition B". On the other hand, when the target data does not satisfy "condition B", it is determined that the target data is classified into the two or more corresponding classes.

"Condition B" includes a "first condition" and a "second condition". In the present exemplary embodiment, determination part F3 determines that "condition B" is satisfied when both the "first condition" and the "second condition" are satisfied.

Figure 5:
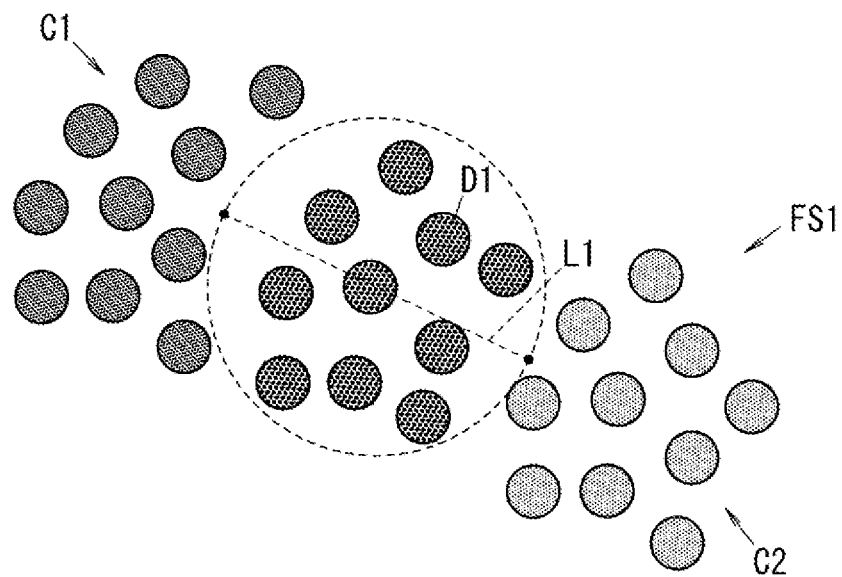
FIG. 5 is an explanatory diagram illustrating an example of a second determination operation in the determination part in the classification system.

The "first condition" is that the feature amount of the target data is between two or more corresponding classes in feature amount space FS1. An example in which the "first condition" is satisfied will be described with reference to FIG. 5. In FIG. 5, "C1" and "C2" represent groups of feature amounts of the target data classified into the first class and the second class in the past in feature amount space FS1, respectively. In FIG. 5, the feature amounts of the target data are represented by different patterns for "C1" and "C2", respectively. Note that the feature amounts of the target data in a region surrounded by a broken line in FIG. 5 belong to both "C1" and "C2". In addition, in FIG. 5, "D1" represents the feature amount of the target data classified by classification part F1 in feature amount space FS1. Note that, although not illustrated in FIG. 5, feature amount space FS1 also includes a group of feature amounts of target data classified in the past into classes other than the first class and the second class.

As illustrated in FIG. 5, "D1" is located between "C1" and "C2". Here, "between two or more corresponding classes" means that, as an example, target data is included inside a circle centered on a center point of a region (line segments in case of two classes, and polygons in case of three or more classes) defined by center points of two or more corresponding classes. In the example illustrated in FIG. 5, "D1" is included inside a circle centered on a center point of line segment L1 defined by the center points of "C1" and "C2".

Figure 6:
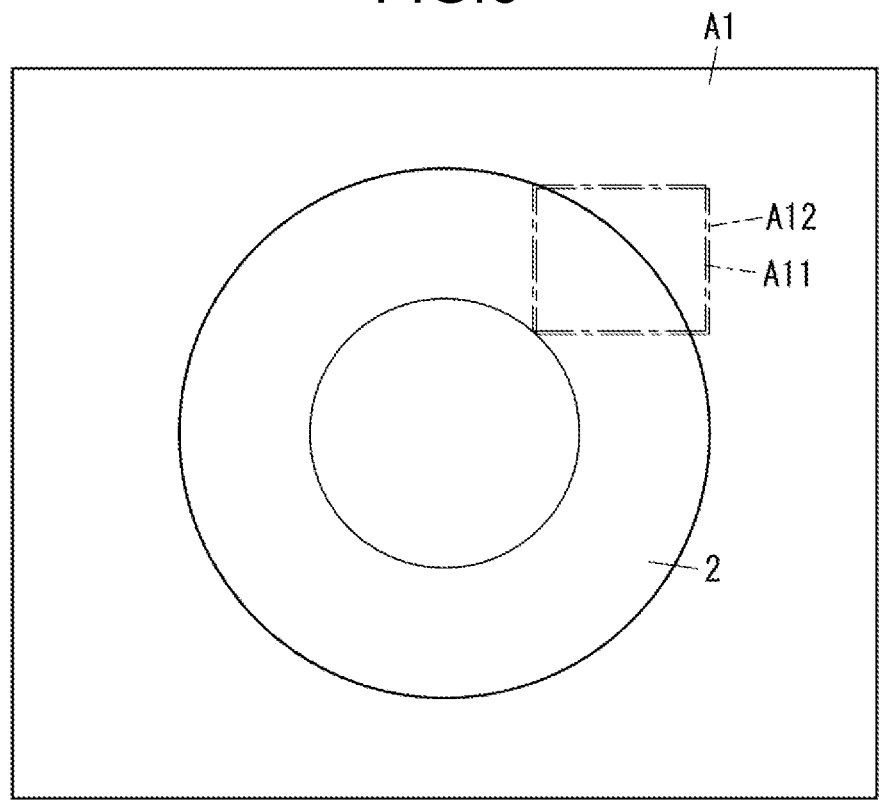
FIG. 6 is an explanatory diagram illustrating another example of the second determination operation in the determination part in the classification system.

The "second condition" means that any of two or more classifiers F11 to F1n corresponding to two or more corresponding classes focuses on the same portion of the target data. In other words, when one of two or more classifiers F11 to F1n corresponding to two or more corresponding classes does not focus on the same portion of the target data, determination part F3 excludes the target data from the candidate. An example in which the "second condition" is satisfied will be described with reference to FIG. 6. FIG. 6 illustrates target image A1 after appropriate visualization processing such as gradient-weighted class activation mapping (Grad-CAM) is performed. In addition, FIG. 6 illustrates first range A11 in which first classifier F11 among two or more classifiers F11 to F1n pays attention in the target data, and second range A12 in which second classifier F12 among two or more classifiers F11 to F1n pays attention in the target data. In the example illustrated in FIG. 6, first range A11 and second range A12 overlap, and two or more classifiers F11, F12 focus on the same portion of the target data.

In the present exemplary embodiment, determination part F3 determines that the target data is classified into the new class when the number of the target data set as candidates for the new class as described above exceeds a predetermined number. That is, determination part F3 does not determine that the target data is classified into the new class at the stage where the target data is set as the candidate of the new class, and determines that the candidate group of the target data is classified into the new class for the first time when the number of the candidates exceeds a predetermined number (for example, dozens).

Storage part 13 includes one or more storage devices. Examples of the storage device are a random access memory (RAM), an electrically erasable programmable read only memory (EEPROM), or the like. Storage part 13 stores the target data and a determination result of determination part F3 for the target data. In the present exemplary embodiment, storage part 13 does not store all the target data input to input reception part 11, but stores the target data (that is, the candidates for the new class) determined by determination part F3 to be likely to be classified into the new class, and the determination result for the target data.

Figure 7:
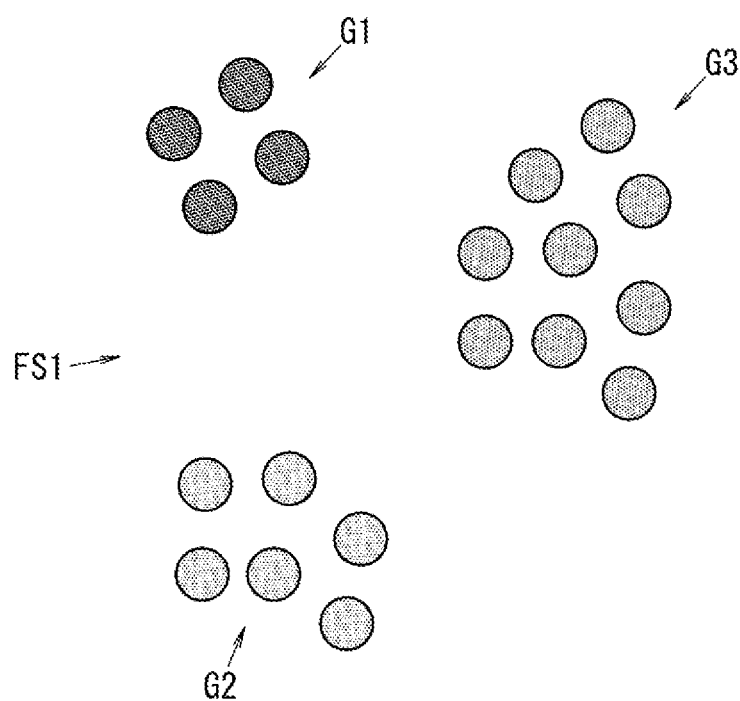
FIG. 7 is an explanatory diagram of a feature amount space indicating a candidate of a new class in the classification system.

In the present exemplary embodiment, the determination result of determination part F3 is stored in storage part 13 in association with group G0 according to similarity of the feature amount of the target data. An example in which the feature amounts of the target data are classified into a plurality of groups G1, G2, and G3 will be described with reference to FIG. 7. In FIG. 7, groups G1 to G3 each represents a group of feature amounts of target data that is a candidate for the new class in feature amount space FS1. In each of groups G1 to G3, the feature amounts of a plurality of the target data are similar to each other. In addition, groups G1 to G3 are at positions separated from each other in feature amount space FS1, that is, are dissimilar to each other. Further, groups G1 to G3 can be determined as the new class by determination part F3 when the number of the candidates of the target data exceeds a predetermined number.

Output part 12 is configured to output information processed by processing part 14. In the present exemplary embodiment, output part 12 includes a port for outputting data, and an image display device for displaying the information. As an example, the image display device may include a thin display device such as a liquid crystal display or an organic electro-luminescence (EL) display.

In the present exemplary embodiment, output part 12 also serves as presentation part 12. Presentation part 12 is configured to present the determination result of determination part F3 to a user of classification system 100 when determination part F3 determines that there is a possibility that the target data is classified into the new class. That is, presentation part 12 is an execution subject of presentation step S9 described later. Here, presentation part 12 presents the determination result to the user by displaying the determination result on the image display device. In the present exemplary embodiment, since the determination result is stored in storage part 13, presentation part 12 presents the determination result read from storage part 13 by processing part 14. For example, presentation part 12 displays target image A1, a message indicating that target image A1 can be classified into the new class, and the like on the image display device as the determination result.

In the present exemplary embodiment, presentation part 12 presents the determination result in a mode according to the number of the target data belonging to group G0. As an example, in a case where "condition C" is not satisfied, presentation part 12 presents the determination result of determination part F3. In this case, presentation part 12 may display the number of the candidates of the target data belonging to each of one or more groups G0 on the image display device. Then, in a case where "condition C" is satisfied, presentation part 12 displays an image or the like prompting the user to relearn classification part F1 on the image display device together with the determination result of determination part F3. "Condition C" means that, in any one of one or more groups G0, the number of the target data set as candidates for the new class by determination part F3 exceeds a predetermined number.

Furthermore, in the present exemplary embodiment, presentation part 12 displays certainty factors in the plurality of classes of the target data, and feature amount space FS1. As an example, in a case where the target data is classified into the other class by classification part F1, and "condition A" is satisfied, presentation part 12 displays feature amount space FS1 as illustrated in FIG. 4 and a list of the certainty factors of each class on the image display device. Furthermore, as an example, in a case where the target data is classified into two or more corresponding classes among the plurality of corresponding classes by classification part F1, and "condition B" is satisfied, presentation part 12 displays feature amount space FS1 as illustrated in FIG. 5, and a list of the certainty factors of each class on the image display device.

(3) Operation

Figure 8:
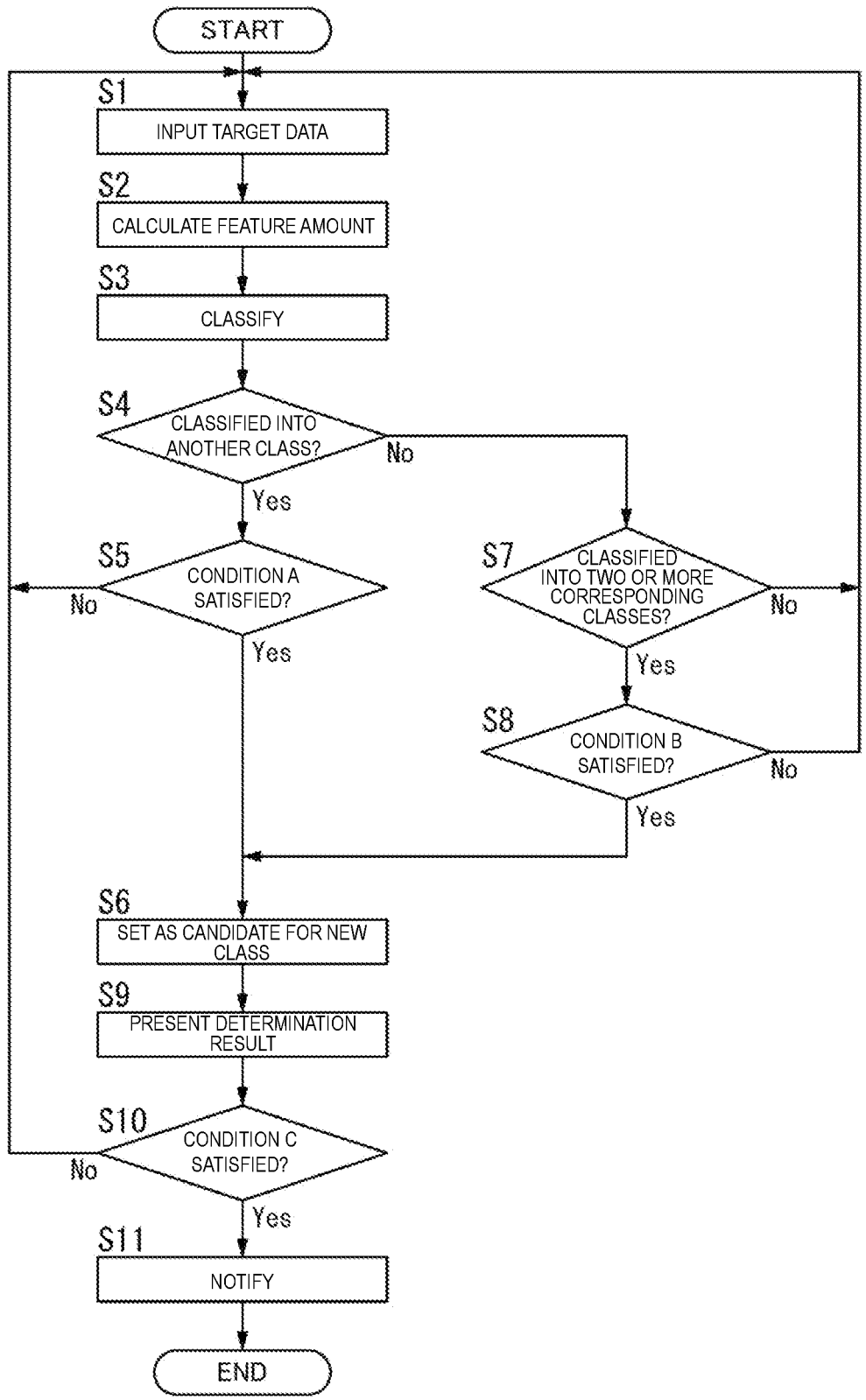
FIG. 8 is a flowchart illustrating an example of an operation of the classification system.

Hereinafter, an example of an operation of the classification system of the present exemplary embodiment will be described with reference to FIG. 8. First, when input reception part 11 receives an input of target data (S1), calculation part F2 calculates a feature amount of the target data received by input reception part 11 (S2). Then, classification part F1 classifies the target data received by input reception part 11 using a learned model (S3). Note that the order of the calculation processing of the feature amount of the target data by calculation part F2 and the classification processing of the target data by classification part F1 may be reversed.

Next, determination part F3 determines a possibility that the target data is classified into the new class based on the classification result in classification part F1 and the feature amount of the target data calculated by calculation part F2. When the target data is classified into another class by classification part F1 (S4: Yes) and the target data satisfies "condition A" (S5: Yes), determination part F3 sets the target data as a candidate for the new class (S6). On the other hand, when classification part F1 does not classify the target data into the other class (S4: No), the target data is classified into two or more corresponding classes among the plurality of corresponding classes (S7: Yes), and "condition B" is satisfied (S8: Yes), determination part F3 sets the target data as a candidate for the new class (S6).

Then, when determination part F3 determines that the target data is a candidate for the new class, that is, there is a possibility that the target data is classified into the new class, presentation part 12 presents the determination result of determination part F3 (S9). Here, when "condition C" is satisfied (S10: Yes), presentation part 12 notifies that classification part F1 is to be relearned by displaying an image or the like prompting the user to relearn classification part F1 on the image display device together with the determination result of determination part F3 (S11).

The user who has received the notification that relearning is to be performed performs a predetermined operation for permitting execution of relearning, for example, using an interface for accepting an operation on processing part 14. Then, processing part 14 executes relearning of the learned model of classification part F1 using a group of target data determined to be classified into the new class as teacher data. As described above, in the present exemplary embodiment, classification part F1 relearns the target data determined to be classified into the new class by determination part F3 as teacher data. In the present exemplary embodiment, the relearning of classification part F1 corresponds to adding a new class. In addition, "adding a new class" corresponds to adding a new classifier that determines whether the input target data is classified into the new class in classification part F1.

(4) Advantages

As described above, in the present exemplary embodiment, when determination part F3 determines that there is a possibility that the target data is classified into the new class, classification system 100 presents to the user that the new class is necessary, instead of automatically relearning classification part F1 and classifying the target data into the new class. Therefore, in the present exemplary embodiment, there is an advantage that even when target data that can belong to a new class that is not in an existing class is input, the target data can be easily classified appropriately.

Here, in a case where the learning of each of classifiers F11 to F1n of classification part F1 is insufficient, there is a possibility that determination part F3 may erroneously determine that there is a possibility that the target data is classified into the new class even in a case where the target data is correctly classified into any class of the plurality of classes. Therefore, in the present exemplary embodiment, since presentation part 12 presents the determination result of determination part F3, there is an advantage that it is possible to leave the determination as to whether or not the target data is classified into the new class to the user, and it is possible to improve the certainty that the target data is classified into the new class.

(5) Modified Examples

The above-described exemplary embodiment is merely one of various exemplary embodiments of the present disclosure. The above-described exemplary embodiment can be variously changed according to a design and the like as long as the object of the present disclosure can be achieved. In addition, functions similar to those of classification system 100 according to the above-described exemplary embodiment may be embodied by a classification method, a computer program, a non-transitory recording medium recording a computer program, or the like.

A classification method according to one aspect includes input reception step S1, classification step S3, calculation step S2, determination steps S4 to S8, and presentation step S9. Input reception step S1 is a step of receiving an input of target data. Classification step S3 is a step of classifying the target data into any one of a plurality of classes. Calculation step S2 is a step of calculating a feature amount of the target data. Determination steps S4 to S8 are steps of determining whether it is possible that the target data is classified into a new class different from the plurality of classes based on a classification result in classification step S3 and the feature amount of the target data calculated in calculation step S2. Presentation step S9 is a step of presenting a determination result of determination steps S4 to S8 when it is determined in determination steps S4 to S8 that there is a possibility that the target data is classified into the new class. A (computer) program according to an aspect causes one or more processors to execute the above classification method.

Modified examples of the exemplary embodiment described above will be hereinafter listed. The modified examples described below can be applied in appropriate combination.

Classification system 100 according to the present disclosure includes, for example, a computer system in processing part 14 and the like. The computer system mainly includes a processor and a memory as hardware. A processor executes a program recorded in a memory of the computer system to implement a function as classification system 100 in the present disclosure. The program may be recorded in advance in the memory of the computer system, may be provided through a telecommunication line, or may be provided by being recorded in a non-transitory recording medium readable by the computer system such as a memory card, an optical disk, or a hard disk drive. The processor of the computer system includes one or a plurality of electronic circuits including a semiconductor integrated circuit (IC) or a large-scale integrated circuit (LSI). The integrated circuit such as an IC or an LSI in this disclosure is called differently depending on a degree of integration, and includes an integrated circuit called a system LSI, a very large scale integration (VLSI), or an ultra large scale integration (ULSI). Further, the following device can be employed as the processor: a field-programmable gate array (FPGA) that is programmed after being manufactured as an LSI, or a logic device in which it is possible to reconfigure a bonding relationship inside an LSI or a circuit section inside the LSI. The plurality of electronic circuits may be integrated into one chip or may be provided in a distributed manner on a plurality of chips. The plurality of chips may be integrated in one device or may be provided in a distributed manner in a plurality of devices. The computer system in this disclosure includes a microcontroller having one or more processors and one or more memories. Therefore, the microcontroller is also constituted by one or a plurality of electronic circuits including a semiconductor integrated circuit or a large-scale integrated circuit.

In addition, it is not an essential configuration for classification system 100 that a plurality of functions in classification system 100 are aggregated in one housing, and the components of classification system 100 may be provided in a distributed manner in a plurality of housings. Furthermore, at least a part of the functions of classification system 100 may be realized by a cloud (cloud computing) or the like.

In the above-described exemplary embodiment, presentation part 12 may present the determination result to the user only when it is determined that the target data is classified into the new class, instead of presenting the determination result to the user every time the determination result is obtained by determination part F3. That is, presentation part 12 may not present the determination result to the user only when determination part F3 determines that the target data is a candidate to be classified into the new class.

In the above-described exemplary embodiment, in a case where classification part F1 relearns the target data determined to be classified into the new class as teacher data, a correct answer label attached to the target data may be determined by the user or may be automatically determined by processing part 14.

In the above-described exemplary embodiment, the user may cause classification part F1 to relearn after excluding target data considered not to correspond to the new class from a group of target data presented by presentation part 12.

In the above-described exemplary embodiment, the target data is not limited to the image data of determination object 2, and may be sound data emitted by determination object 2. In this case, the "second condition" in determination part F3 means that any of two or more classifiers F11 to F1n corresponding to two or more corresponding classes focuses on the same portion (time-series change) of the target data.

In the above-described exemplary embodiment, when determination part F3 determines whether or not there is a possibility that the target data is classified into the new class, the "second condition" of the "first condition" and the "second condition" of "condition B" may not be adopted. That is, determination part F3 may set the target data as a candidate to be classified into the new class only by satisfying a condition that the target data is classified into two or more corresponding classes and the feature amount of the target data is between two or more corresponding classes in feature amount space FS1.

In the above-described exemplary embodiment, presentation part 12 may output the determination result of determination part F3 by voice using, for example, a speaker or the like. In this case, presentation part 12 may display the determination result of determination part F3 on the image display device together with the output of the voice.

CONCLUSION

As described above, classification system (100) according to a first aspect includes input reception part (11), classification part (F1), calculation part (F2), and determination part (F3). Input reception part (11) receives an input of target data. Classification part (F1) classifies the target data into any one of a plurality of classes. Calculation part (F2) calculates a feature amount of the target data. Determination part (F3) determines a possibility that the target data is classified into a new class different from the plurality of classes based on a classification result in classification part (F1) and the feature amount of the target data calculated by calculation part (F2).

According to this aspect, there is an advantage that even when target data that can belong to a new class that is not in an existing class is input, the target data can be easily classified appropriately.

Classification system (100) according to a second aspect further includes presentation part (12) in the first aspect. When determination part (F3) determines that there is a possibility that the target data is classified into the new class, presentation part (12) presents a determination result of determination part (F3).

In classification system (100) according to a third aspect, in the first or second aspect, the plurality of classes include a plurality of corresponding classes respectively corresponding to a plurality of classifiers (F11 to F1n) included in classification part (F1), and another class not corresponding to any of the plurality of classifiers (F11 to F1n). Determination part (F3) distinguishes and determines whether the target data is classified into the other class or the new class.

According to this aspect, there is an advantage that it is difficult to erroneously determine that there is a possibility that the target data is classified into the new class in a case where the learning of classification part (F1) is not sufficient.

In classification system (100) according to a fourth aspect, in the third aspect, determination part (F3) sets the target data as a candidate to be classified into the new class when the following conditions are satisfied. The above conditions are that the target data is classified into the other class, a certainty factor is lower than a threshold in any of the plurality of corresponding classes, and the feature amount of the target data is separated from any of the plurality of corresponding classes by greater than or equal to a predetermined distance in feature amount space (FS1).

According to this aspect, there is an advantage that it is difficult to erroneously determine that there is a possibility that the target data is classified into the new class in a case where the learning of classification part (F1) is not sufficient.

In classification system (100) according to a fifth aspect, in the third aspect, determination part (F3) sets target data as a candidate to be classified into the new class when the following conditions are satisfied. The above conditions are that the target data is classified into two or more corresponding classes of the plurality of corresponding classes, and the feature amount of the target data is between the two or more corresponding classes in feature amount space (FS1).

According to this aspect, there is an advantage that it is difficult to erroneously determine that the target data is not classified into the new class in a case where the learning of classification part (F1) is not sufficient.

In classification system (100) according to a sixth aspect, in the fifth aspect, determination part (F3) excludes the target data from the candidate when the following condition is satisfied. The above condition is that any of two or more classifiers (F11 to F1n) corresponding to the two or more corresponding classes does not focus on the same portion of the target data.

According to this aspect, there is an advantage that determination accuracy of whether there is a possibility that the target data is classified into the new class is easily improved.

In classification system (100) according to a seventh aspect, in any one of the fourth to sixth aspects, determination part (F3) determines that the target data is classified into the new class when the number of candidate target data exceeds a predetermined number.

According to this aspect, there is an advantage that determination accuracy of whether or not the target data is classified into the new class is easily improved.

Classification system (100) according to an eighth aspect further includes storage part (13) in the second aspect. Storage part (13) stores the target data and the determination result of determination part (F3) for the target data.

According to this aspect, there is an advantage that presentation part (12) can present the past determination result stored in storage part (13).

In classification system (100) according to a ninth aspect, in the eighth aspect, the determination result is stored in storage part (13) in association with group (G0) according to similarity of the feature amount of target data.

According to this aspect, there is an advantage that the target data can be easily classified into an appropriate new class as compared with a case where the target data is stored in association with one group (G0).

In classification system (100) according to a tenth aspect, in the ninth aspect, presentation part (12) presents the determination result in a mode according to the number of the data belonging to group (G0).

According to this aspect, there is an advantage that the user can easily grasp a degree of possibility that the target data is classified into the new class by confirming the information presented by presentation part (12).

In classification system (100) according to an eleventh aspect, in any one of the first to tenth aspects, classification part (F1) relearns the target data determined to be classified into the new class by determination part (F3) as teacher data.

According to this aspect, there is an advantage that a new class can be added to classification part (F1), and improvement in classification accuracy of the target data by classification part (F1) can be expected.

In classification system (100) according to a twelfth aspect, in any one of the second and eighth to tenth aspects, presentation part (12) displays certainty factors of the target data in the plurality of classes, and feature amount space (FS1).

According to this aspect, there is an advantage that the user can easily grasp the determination result of determination part (F3) by viewing an image displayed by presentation part (12).

A classification method according to a thirteenth aspect includes input reception step (S1), classification step (S3), calculation step (S2), and determination steps (S4 to S8). Input reception step (S1) is a step of receiving an input of target data. Classification step (S3) is a step of classifying the target data into any one of a plurality of classes. Calculation step (S2) is a step of calculating the feature amount of the target data. Determination steps (S4 to S8) are steps of determining whether it is possible that the target data is classified into a new class different from the plurality of classes based on a classification result in classification step (S3) and the feature amount of the target data calculated in calculation step (S2).

According to this aspect, there is an advantage that even when target data that can belong to a new class that is not in an existing class is input, the target data can be easily classified appropriately.

In a classification method according to a fourteenth aspect, in the thirteenth aspect, presentation step (S9) is a step of presenting a determination result of determination steps (S4 to S8) when it is determined in determination steps (S4 to S8) that there is a possibility that the target data is classified into the new class.

A program according to a fifteenth aspect causes one or more processors to execute the classification method according to the thirteenth or fourteenth aspect.

According to this aspect, there is an advantage that even when target data that can belong to a new class that is not in an existing class is input, the target data can be easily classified appropriately.

The configurations according to the second to twelfth aspects are not essential to classification system (100), and can be omitted as appropriate.

The classification system, the classification method, and the program of the present disclosure have an advantage that it is easy to appropriately classify target data even when the target data that can belong to a new class that is not in an existing class is input. Therefore, the classification system, the classification method, and the program of the present disclosure can be used for inspecting an object and the like, and are industrially useful.

The invention claimed is:

1. A classification system comprising:
   an input interface configured to receive an input of target data;
   a classification circuit that includes a plurality of classifiers and an NOR circuit connecting in parallel to each of the plurality of classifiers, outputs from the plurality of classifiers being input into the NOR circuit, the classification circuit comprising a learned neural network configured to classify the target data into a class that includes any one of a plurality of classes, the plurality of classes including a plurality of corresponding classes each corresponding to a respective one of the plurality of classifiers included in the classification circuit, and another class not corresponding to any of the plurality of classifiers; and
   one or more processors configured to calculate a feature amount of the target data, and determine whether it is possible that the target data is classified into a new class different from the plurality of classes based on a classification result by the classification circuit and the feature amount of the target data calculated by the one or more processors, wherein:
   the classification circuit comprises a learned neural network, and
   the classification circuit is configured to classify, by using the learned neural network, the target data into the new class when the feature amount of the target data differs from any feature amount of the target data that are classified into the class that includes any one of the plurality of classes.

2. The classification system according to claim 1, further comprising a display that presents a determination result by the one or more processors when the one or more processors determine that whether it is possible that the target data is classified into the new class.

3. The classification system according to claim 1, wherein:
the one or more processors are configured to distinguish and determine whether the target data is classified into the other class or the new class.

4. The classification system according to claim 3, wherein when the target data is classified into the other class, a certainty factor is lower than a threshold in any of the plurality of corresponding classes, and the feature amount of the target data is separated from any of the plurality of corresponding classes by greater than or equal to a predetermined distance in a feature amount space, the one or more processors are configured to set the target data as a candidate classified into the new class.

5. The classification system according to claim 3, wherein when the target data is classified into two or more corresponding classes of the plurality of corresponding classes, and the feature amount of the target data is between the two or more corresponding classes in a feature amount space, the one or more processors are configured to set the target data as a candidate classified into the new class.

6. The classification system according to claim 5, wherein when any of two or more classifiers corresponding to the two or more corresponding classes does not focus on the same portion of the target data, the one or more processors are configured to exclude the target data from the candidate.

7. The classification system according to claim 4, wherein the one or more processors are configured to determine that the target data is classified into the new class when the number of the target data set as the candidate exceeds a predetermined number.

8. The classification system according to claim 2, further comprising a storage that stores the target data and the determination result of the one or more processors for the target data.

9. The classification system according to claim 8, wherein the determination result is stored in the storage in association with a group according to similarity of the feature amount of the target data.

10. The classification system according to claim 9, wherein the display presents the determination result in a mode according to the number of the target data belonging to the group.

11. The classification system according to claim 1, wherein
the classification circuit is configured to relearn the target data classified into the new class determined by the one or more processors as teacher data.

12. The classification system according to claim 2, wherein
the display displays certainty factors of the target data in the plurality of classes, and a feature amount space.

13. A classification method performed by one or more processors, comprising:
an input reception step of receiving an input of target data;
a calculation step of calculating a feature amount of the target data;
a classification step of classifying the target data into any one of a plurality of classes and classifying the target data into the new class when the feature amount of the target data differs from any feature amount of the target data that are classified into the class that includes any one of a plurality of classes; and
a determination step of determining whether it is possible that the target data is classified into a new class different from the plurality of classes based on a classification result in the classification step and the feature amount of the target data calculated in the calculation step,
wherein the classification step utilizes a plurality of classifiers and an NOR circuit connecting in parallel to each of the plurality of classifiers generated by deep learning using a multilayer neural network.

14. The classification method according to claim 13, further comprising a presentation step of presenting a determination result of the determination step when it is determined in the determination step that there is a possibility that the target data is classified into the new class.

15. The classification system according to claim 3, wherein:
when an output from the NOR circuit is "Low", the one or more processors are configured to classify the target data to the another class.

16. The classification system according to claim 1, wherein the classification circuit includes an integrated circuit on which the learned neural network is mounted.

* * * * *